United States Patent Office 3,402,219
Patented Sept. 17, 1968

3,402,219
COATING COMPOSITIONS COMPRISING STYRENE INTERPOLYMER, AMINOPLAST, AND HYDROXY-CONTAINING POLYESTER
Robert W. Hill, Leawood, and Francis R. Galiano, Prairie Village, Kans., assignors to Gulf Oil Corporation, Pittsburgh, Pa., a corporation of Pennsylvania
No Drawing. Filed Apr. 9, 1965, Ser. No. 447,082
25 Claims. (Cl. 260—850)

ABSTRACT OF THE DISCLOSURE

Coatings for thermoplastic polymer articles are obtained by providing a solvent solution of a curable admixture comprised of a hydroxy-containing interpolymer of styrene, curable aminoplast and a hydroxy containing polyester having a hydroxy number of at least 50, typical examples are reaction products of polybasic acids (or the corresponding anhydrides thereof) and dihydric alcohols, such as 2,4,6-trioxo-s-triazine-1,3,5(2H,4H,6H)-trialkanoic acid, and a glycol or trimelletic anhydride and a glycol, and reaction products of a polyhydric alcohol and a dibasic acid, such as trimethylol propane and a dibasic acid or trihydroxy-ethyl-isocyanurate and a dibasic acid. In general, for ease of reaction and faster cures, the hydroxyl groups, of the alcohols, are preferably attached to primary carbons, i.e., so as to form primary alcohols.

---

This invention relates to coating compositions, and more particularly to curable compositions suitable for surface coating of thermoplastic polymer articles.

The use of coatings on thermoplastic polymer articles has found widespread use in the industry. Generally, these coatings are applied to improve the characteristics of the articles for aesthetic purposes, printability and to provide resistance to various liquids and to permeation of the polymer by vapors and liquids. However, many of the coatings that have been available for this purpose have been deficient in various respects. For example, although moderately successful, many of the coating compositions presently available either require a preliminary pretreatment of the polymer surface to promote adhesion, or require long baking cycles to cure the coating compositions, or they can be used only on a limited number of polymer substrates. In addition, such coatings tend to be brittle and crack on flexing, and militate against the use of such coatings on polymer articles requiring flexing, i.e., "squeeze bottles."

In contract to the foregoing this invention provides an adherent coating composition of enhanced flexibility and resistance to permeation by a wide variety of liquids.

Accordingly, it is an object of this invention to provide novel coating compositions.

Another object of this invention is to provide novel coating compositions which have good adhesion to a variety of polymer substrates.

Still another object of this invention is to provide novel coating compositions which adhere well to a variety of polymer substrates and require only modest baking cycles to cure.

Still another object of this invention is to provide novel coating compositions which adhere well to a variety of polymer substrates, require only modest baking cycles to cure, and which offer effective resistance to permeation of a variety of commonly employed organic liquids and solvents.

A still further object of this invention is to provide thermoplastic polymer articles with the surface thereof carrying novel adherent coatings which are flexible and resist cracking.

It is still another object of this invention to provide polymer articles having a surface thereof coated with novel coating compositions which are resistant to permeation by a variety of commonly employed liquids and solvents.

Other objects and advantages will become more apparent from the following detailed description of this invention.

It has been discovered, in accordance with this invention, that the above and other related objects and advantages can be obtained by providing a solvent solution of a curable admixture comprised of a hydroxy-containing interpolymer of styrene, curable aminoplast and a hydroxy containing polyesters having a hydroxy number of at least 100, and preferably 120 to 180, typical examples are reaction products of polybasic acids (or the corresponding anhydrides thereof) and dihydric alcohols, such as 2,4,6-trioxo-s-triazine-1,3,5(2H,4H,6H)-trialkanoic acid, and a glycol or trimellitic anhydride and a glycol, and reaction products of a polyhydric alcohol and a dibasic acid, such as trimethylol propane and a dibasic acid or trihydroxy-ethyl-isocyanurate and a dibasic acid. In general, for ease of reaction and faster cures, the hydroxyl groups, of the alcohols, are preferably attached to primary carbons, i.e., so as to form primary alcohols.

More specifically, the hydroxy-containing interpolymers of styrene, comprehended by this invention, are any of the copolymers of styrene containing a pendant hydroxy-substituent group capable of reacting with methylol groups of aminoplast curing agents. The method of preparing these copolymers is not critical; and they may be prepared directly by polymerizing styrene with a polymerizable unsaturated alcohol, such as allyl and methallyl alcohol, or they may be prepared by suitable modification of styrene copolymers, as for example oxidation of a styrene/butadiene copolymer and hydrogenation of a styrene/methacrolein copolymer. Some of these hydroxy-containing styrene copolymers are also commercially readily available.

A typical process for preparing hydroxy-containing interpolymers of styrene (hereinafter referred to for convenience as styrene/hydroxy copolymers) is disclosed in U.S. Letters Patent No. 2,893,979. As described in this patent, the specific characteristics of the hydrogenated styrene/methacrolein copolymers are dependent upon the extent of hydrogenation effected. Moreover, the number of hydroxy groups obtained and the number of residual aldehyde groups will depend on the amount of hydrogenation, but will not be critical for purposes of this invention since it is only necessary that the styrene/hydroxy copolymers contain a sufficient average number of hydroxy-substituent groups per copolymer molecule capable of reacting with methylol groups to provide a cohesive coating with the other components. Normally, these styrene/hydroxy copolymers can be prepared in a molecular weight of 700 to 10,000 containing from about 50–90 percent of chemically combined styrene. For practical and economic purposes, the preferred hydrogenated styrene/methacrolein copolymers have a molecular weight of 1,000 to 10,000 and contain 60–85 weight percent of chemically combined styrene and 4–10 weight percent of hydroxy groups.

Typical hydrogenated copolymers of styrene/methacrolein are set forth in Table I below.

TABLE I.—HYDROGENATED STYRENE/METHACROLEIN COPOLYMERS

| | Weight percent styrene | Weight percent hydroxy groups | Molecular weight |
|---|---|---|---|
| A | 63 | 9.8 | 8,000 |
| B | 68 | 6.3 | 2,000 |
| C | 75 | 4.4 | 2,000 |
| D | 75 | 4.4 | 4,000 |

Typical processes for preparing styrene/hydroxy copolymers by oxidation of styrene/butadiene copolymers are disclosed in U.S. Letters Patents No. 2,873,199 and No. 2,895,979. As will be understood the number of hydroxy groups formed will also determine the characteristics and properties of oxidized styrene/butadiene copolymer. The extent of oxidation is not critical, and the presence of associated formation of aldehyde groups, carboxyl an the like will not detract from the ability of a formed hydroxy groups to react with methylol groups in the compositions of this invention. Again, for practical and economic purposes, the preferred oxidized styrene/butadiene copolymers will have a molecular weight of 5,000–12,000 and contain from about 35 to about 75 weight percent of chemically combined styrene and from about 1 to about 10 weight percent of hydroxy groups.

Typical oxidized styrene/butadiene copolymers are set forth in Table II below.

TABLE II.—OXIDIZED STYRENE/BUTADIENE COPOLYMERS

| | Weight percent styrene | Weight percent hydroxy groups | Acid No. | Molecular weight |
|---|---|---|---|---|
| A | 55 | 1 | 12 | 8,000 |
| B | 40 | 5 | 16 | 8,000 |

Typical processes for the direct preparation of styrene/allyl alcohols are disclosed in U.S. Letters Patents No. 2,894,938 and No. 2,951,831. Although substantially all of these copolymers are operative in the compositions of this invention, the preferred copolymers again have a molecular weight of 1,000 to 10,000, and contain from about 50 to about 85 weight percent of chemically combined styrene.

Typical styrene/allyl alcohol copolymers are set forth in Table III below.

TABLE III.—STYRENE/ALLYL ALCOHOL COPOLYMERS

| | Weight percent styrene | Weight percent Hydroxy groups | Molecular weight |
|---|---|---|---|
| A | 74 | 5.2 | 1,150 |
| B | 80 | 5.4 | 1,600 |

In general all of the preferred styrene/hydroxy copolymers, for purposes of this invention, will have a molecular weight of 1,000 to 10,000, 65 to 85 weight percent of chemically combined styrene and 4 to 7 weight percent of hydroxy groups.

The aminoplast curing agents comprehended in this invention are any of the solvent soluble methylol or methylol ether-containing aldehyde reaction products well known in the art, and which are able to react with hydroxy substituent groups. These resins can be synthesized in any appropriate manner, and it is only necessary that they be in the uncured state and solvent soluble, i.e. as intermediate products (hereinafter referred to as precondensates) capable of further condensation (curing) on heating, with or without a catalyst. Typical examples of the aminoplast curing agents are urea-formaldehyde, alkylated urea-formaldehyde, melamine-formaldehyde, alkylated melamine-formaldehyde, and in particular hexamethoxymethyl-melamine, trihydroxymethyl-melamine and dihydroxymethyl ethyleneurea.

Typical aminoplast resins are set forth in Table IV below.

TABLE IV.—AMINOPLAST RESIN PRECONDENSATES

| Trade name | Type | Source |
|---|---|---|
| B Cymel 245-8 | Butylated melamine formaldehyde. | Am. Cyanamid. |
| C Cymel 248-8 | do | Do. |
| D Cymel 247-10 | do | Do. |
| A Cymel 300 | Hexamethoxymethyl-melamine. | Do. |
| E Beetle 212-19 | Urea formaldehyde | Do. |
| F Beetle 220-8 | Butylated urea formaldehyde. | Do. |
| G Beetle 230-8 | do | Do. |
| H Beckamine P-196 | Urea formaldehyde | Riechhold Chem. |

Particularly effective polyester resin components of the coating compositions of this invention are of the type described in the copending application of L. V. Phillips and W. C. Francis, Ser. No. 110,901, filed May 23, 1961 and assigned to the assignee of the present application. Such polyester resins are prepared by reacting 2,4,6-trioxo-s-triazine-1,3,5(2H,4H,6H)-trialkanoic acid with a polyhydric alcohol. Ordinarily, a sufficient quantity of the polyhydric alcohol will be employed so that the resultant polyesters will have a hydroxyl number in excess of 50 and preferably in excess of 100. If desired, additional polycarboxylic acids may be employed in the preparation of the polyester resins. Examples of such acids include succinic, maleic, glutaric, adipic, suberic, azelaic and isophthalic acids and alkyl substituted derivatives of these acids. In all cases, however, the 2,4,6-trioxo-s-triazine-1,3,5(2H,4H,6H)-trialkanoic acid should constitute at least about 30 mole percent of the polybasic acids employed in the preparation of the polyester resin. The polyhydric alcohols that may be employed include ethylene glycol, diethylene glycol, 1,3-propanediol, 1,2-propanediol, 1,4-butanediol, hydrogenated bisphenol A, neopentyl glycol, 2,2,4-trimethyl pentanediol-1,3, and the like. If desired, monobasic acids and monohydric alcohols may also be employed in the preparation of the polyester to control molecular weight, to modify properties and the like. In many cases, substantial advantages are obtained by including in the resins at least modest quantities of a monobasic acid derived from fatty oils such as oleic acid, tall oil fatty acids, soybean oil fatty acids, linseed oil fatty acids, etc.

The polyester can be prepared by techniques similar to those employed in the manufacture of the well-known alkyd resins. The reactants will be charged to a stirred vessel and heated to temperatures in excess of 100° C. to esterify the carboxyl and hydroxyl groups of the reactants charged. The polymerization will be continued until the polyester resin is rather viscous and the acid number is reduced to below 100 and usually to a value in the range of about 5–75. Typical polyester resin components and their methods of preparation are set forth below.

TABLE V

Polyester Resin A

A mixture of 414 grams (1.2 moles) of 2,4,6-trioxo-s-triazine-1,3,5(2H,4H,6H)-tripropionic acid and 292 grams (2.8 moles) of neopentyl glycol was heated for two hours at 120° C. Adipic acid (68.5 grams, 0.4 mole) was added and heating was continued at 120–125° C. for 6 hours and at 145–150° C. for 3 hours to give a product having an acid number of 50–55 (mg. KOH per gram of resin), and a hydroxyl number of about 140.

Polyester Resin B

A mixture of 690 grams (2.0 moles) of 2,4,6-trioxo-s-triazine-1,3,5(2H,4H,6H)-tripropionic acid, 485 grams (4.66 moles) of neopentyl glycol and 97.2 grams (0.67 mole) of adipic acid was heated for 6½ hours at 145–150° C. to obtain a resin having an acid number of 54 and a hydroxyl number of 135.

Polyester Resin C

Polyester Resin C was prepared in exactly the same manner as Polyester Resin B except for the fact that the 2,4,6,-trioxo-s-triazine-1,3,5(2H,4H,6H)-tripropionic acid was replaced with an equivalent quantity of 2,4,6-trioxo-s-triazine-1,3,5(2H,4H,6H)-triacetic acid. The resin has an acid number of 60 and a hydroxyl number of 140.

Polyester Resin D

A resin was prepared according to the procedure described for Polyester Resin B employing 104 grams (0.3 mole) of 2,4,6-trioxo-s-triazine-1,3,5(2H,4H,6H)-tripropionic acid, 62.4 grams (0.6 mole) of neopentyl glycol, 14.6 grams (0.1 mole) of adipic acid, 13.6 grams (0.1 mole) of pentaerythritol and 28 grams (approx. 0.1 mole)

of tall oil fatty acids. The resin had an acid number of 60 and a hydoxyl number of 165.

Polyester Resin E

A mixture of 1655 grams (4.8 moles) of 2,4,6-trioxo-s-triazine-1,3,5(2H,4H,6H) - tripropionic acid, 1164 grams (11.2 moles) of neopentyl glycol and 233 grams (1.6 moles of adipic acid was heated at 150–165° C. to provide an intermediate product having an acid number of 57. 2-ethyl hexanol was then added to the intermediate product and the mixture was then heated to 210° C. over a 5 hour period to give a resin having an acid number of 7.0.

Polyester Resin F

A resin was prepared from a mixture of 104 grams (0.3 mole) of 2,4,6-trioxo-s-triazine-1,3,5(2H,4H,6H)-tripropionic acid, 36 grams (0.6 mole) of propylene glycol, 13 grams (0.1 mole) of 2-ethylhexanol and 14.6 grams (0.1 mole) of adipic acid. The reactants were heated at 140–160° C. for 8 hours to provide a resin having an acid number of 75 and a hydroxyl number of 140.

Polyester Resin G

A resin was prepared from a mixture of 104 grams (0.3 mole) of 2,4,6,-trioxo-s-triazine-1,3,5(2H,4H,6H)-tripropionic acid, 53 grams (0.7 mole) of propylene glycol and 32 grams (0.1 mole) of hexadecenyl succinic anhydride. The reaction mixture was heated for 5 hours at 160–180° C. to obtain a resin having an acid number of 70 and a hydroxyl number of 150.

The coating compositions of this invention will normally be applied to the articles in the form of a solution consisting essentially of the coating components (i.e., strene/hydroxy copolymer, a curable aminoplast, and polyester resin) dissolved in a suitable solvent therefor. Virtually any of the common solvents can be employed, subject to the obvious limitation that the solvent must dissolve the particular combination of film forming components to be included in the coating composition. Typical solvents that can be employed include methyl ethyl ketone, carbitol acetate (carbitol being the monoethyl ether of diethylene glycol), n-butanol, sec-butanol, methyl isobutyl ketone, amyl acetate, nitroethane, dioxane, etc.

The proportion of coating components to solvent can vary over relatively wide ranges depending on the viscosity desired or required for a particular method by which the coating is to be employed. Generally speaking, however, the solution will comprise about 10 to 50 percent, and normally 25 to 45 percent by weight of the coating components.

The proportions of the several coating components can be varied over relatively wide ranges. For example, in the admixture of coating components, the amount of styrene/hydroxy copolymer may range from about 10 to about 60 parts by weight, the amount of aminoplast may range from about 10 to about 40 parts by weight, and the polyester resin may range from about 30 to about 80 parts by weight. The specific proportions of coating components will generally be dependent on the type of the several coating components selected for a specific characteristic desired in the coating. Normally and for all practical purposes, the admixture of coating components will comprise from about 10 to 40 parts by weight of the styrene/hydroxy component, 40 to 75 parts by weight of the polyester resin, and from 15 to 35 parts by weight of the aminoplast resin. However, it is to be understood that proportions of coating components outside these ranges can be utilized for the production of coatings having special properties.

In practice, the styrene/hydroxy copolymer, the aminoplast resign and the polyester resin are admixed in the desired proportions in a suitable solvent, and the solution applied to the surface of the article to be coated by conventional techniques such as by spraying, dipping, roller-coating, or flushing in the case of interior coating of containers. Subsequent to the application of the coating, suitable manipulative and draining steps may be employed to insure the application of an even coating on the desired surface of the article. If the coating (in solution) is to be applied to the exterior surface of an article (i.e., a polyethylene bottle), the article can simply be immersed in the coating solution and allowed to drain.

The coating is then cured by subjecting the coated article to a curing temperature for a sufficient period of time to produce the desired chemical reaction between the several coating components. Normally the conditions under which the several coating components can be cured may be varied over a fairly wide range, however, preferably, the coating will be cured at a temperature of 150 to 400° F. for a period of 10 seconds to 1 hour. As will be understood, shorter periods of time may obviously be employed with higher curing temperatures. Normally, the softening point of the thermoplastic polymer being coated will constitute the upper limit of the curing temperature. Although the coating can be cured by heating alone, the curing times and temperatures can preferably be varied and controlled by use of catalysts of the type commonly employed for the curing of known aminoplast resins. Typical examples of these catalysts include toluene sulfonic acid, phosphoric acid, butyl phosphoric acid, phenyl phosphoric acid, isooctyl phosphoric acid, sulfamic acid, benzenephosphonic acid, and hydrochloric acid.

In preparing the coating compositions of this invention, it has been noted that in many cases the quality of the utimately cured coating can be improved by including a plasticizer in the coating compositions. When a plasticizer is employed, it should be employed in the ratio of 5–30 and preferably 10–20 parts per 100 parts of the total amount of the three coating components. Common plasticizers which are suitable for use in this invention include tricresyl phosphate, dioctyl phenyl phosphate, dioctyl phthalate, dioctyl adipate and didecyl phthalate In addition to the foregoing, virtually any of the common and well-known ester type plasticizers may be employed.

In addition to the additives above described, the coating compositions of this invention can also contain additional additives of the type commonly employed in coating compositions. For example, the coating compositions may be colored with either oil or spirit-soluble colors and dyes, or pigments such as carbon black, titanium dioxide and other common pigments included in baking enamels. Stabilizers, antioxidants, antistatic agents, antiskinning agents and the like, may also be employed if desired.

For purposes of providing a better understanding of this invention the following specific examples are given as illustrations of this invention. Unless otherwise noted, where parts, percentages or quantities are mentioned, they are parts, percentages or quantities by weight.

EXAMPLE I

A coating solution was prepared by dissolving, in methyl ethyl ketone, 5 parts of the oxidized styrene/butadiene copolymer of II–A (of Table II), 5 parts of hexamethoxymethyl-melamine, 15.2 parts of the polyester resin V–A (of Table V), and 0.5 parts of p-toluene sulfonic acid as a catalyst. The solution was then diluted with additional solvent to 28 percent component resin solids. The resultant solution was then dip applied to 3 untreated pint polyethylene bottles. The polyethylene was of the linear type having a density of .940. The coated bottles were then cured by heating for 15 minutes at 87° C. The resultant films on the bottles had good adhesion (flexing and adhesive tests would not separate the film from the substrate), high gloss and antistatic properties.

Table VI below sets forth similar coating compositions (e.g., containing oxidized styrene/butadiene copolymers)

which will give comparable results when applied to polyethylene as in Example I.

TABLE VI

| Component | Coating compositions | | |
|---|---|---|---|
| | VI-A | VI-B | VI-C |
| S/O copolymer¹ II-A | 15 | | 25 |
| S/O copolymer¹ II-B | | 35 | |
| A/P resin² IV-A | 15 | 15 | |
| A/P resin² IV-B | | | 15 |
| Polyester resin³ V-I | 70 | 50 | |
| Polyester resin³ V-E | | | 60 |
| Plasticizer⁴ A | 10 | 10 | 10 |
| Catalyst⁵ A | 2 | | 2 |
| Catalyst⁵ B | | 2 | |
| Solvent A | Sufficient to make 40% nonvolatile solution⁶ | | |

¹ Oxidized copolymer of styrene/butadiene from Table II.
² Aminoplast resin from Table IV.
³ Polyester resin from Table V.
⁴ Weight percent based on total solids in coating composition.
⁵ Weight percent based on total solids in coating composition.
⁶ Commercially formulations prepared by adding sufficient solvent to make a coating composition containing 80% non-volatile solids, which is diluted with additional solvent to desired concentration, e.g. 40%.
Plasticizer A is Santicizer 141. Plasticizer B is Texanol adipate. Plasticizer C is KP-140.
Catalyst A is p-toluene sulfonic acid. Catalyst B is isooctyl acid phosphate.
Solvent A is methyl ethyl ketone.

EXAMPLE II

A coating solution was prepared by dissolving in methyl ethyl ketone, 6 parts of the styrene/allyl alcohol copolymer III-A (of Table III), 4 parts of hexamethoxymethyl-melamine, and 12 parts of the polyester V-B (of Table V) and 0.44 parts of p-toluene sulfonic acid as the curing catalyst. The solution was then diluted to 40 percent component resin solids. The resultant solution was then dip applied to 4 natural polyethylene (density 0.940) 4-oz. Boston-Round bottles. The coated bottles were then cured at 87° C. for about 15 minutes. The resultant film on the bottles was clear, tack-free, had good gloss, adhesion and antistatic properties.

Table VII below sets forth similar coating compositions (e.g., containing styrene/allyl alcohol copolymers) which will give comparable results when coated on polyethylene as in Example II.

TABLE VII

| Component | Coating compositions | | | |
|---|---|---|---|---|
| | VII-A | VII-B | VII-C | VII-D |
| S/A Copolymer¹ III-A | 25 | 20 | 15 | |
| S/A Copolymer¹ III-B | | | | 30 |
| A/P resin² IV-A | 15 | 30 | 15 | |
| A/P resin² IV-F | | | | 25 |
| Polyester resin³ V-I | | 50 | | |
| Polyester resin³ V-G | | | | 45 |
| Polyester resin³ V-B | 60 | | 70 | |
| Plasticizer⁴ A | 10 | 10 | | 10 |
| Plasticizer⁴ B | | | 10 | |
| Catalyst⁵ A | 2 | 2 | 2 | |
| Catalyst⁵ B | | | | 2 |
| Solvent⁷ | Sufficient to make 40 percent nonvolatile solids⁶ | | | |

¹ Styrene/allyl alcohol copolymers from Table III.
² Aminoplast resin from Table IV.
³ Polyester resin from Table V.
⁴ Weight percent based on total solids in coating compositions.
⁵ Weight percent based on total solids in coating compositions.
⁶ See Table VI.
Plasticizer A is Santicizer 141. Plasticizer B is Texanol adipate.
Catalyst A is toluene sulfonic acid. Catalyst B is phenyl phosphoric acid.
⁷ Solvent is any suitable solvent such as methyl ethyl ketone, sec-butanol, etc.

EXAMPLE III

A coating solution was prepared by dissolving in dioxane, 5 parts of the hydrogenated styrene/methacrolein copolymer I-B (of Table I), 2.7 parts of hexamethoxymethyl-melamine, 8 parts of the Polyester resin V-A (of Table V), and 0.3 part of p-toluene sulfonic acid (as the catalyst). The solution was diluted to 17 percent component solids, and then coated on a 4-oz. Boston round bottle of natural polyethylene (density 0.940). The coated bottles were then cured at 83° C. for 15 minutes. No flash-off time was necessary. The resultant film was tack-free upon removal from the oven. Gloss, adhesion and anti-static properties were all good.

One of the marked advantages of the compositions of this invention is in the flexibility of the coatings formed therefrom. For example, compositions comprised of styrene/allyl alcohol copolymers, polyester resins and the aminoplast resins provided coatings having flexibilities which are distinctively superior to coating compositions comprised of only styrene/allyl alcohol copolymers and aminoplast resins.

The coating compositions, of this invention, comprised of indicated ranges of components provide especially significant advantages. For example, coating formulations prepared from 60 weight percent polyester resin V-B, 15 weight percent styrene/allyl alcohol copolymer III-A and 25 weight percent of aminoplast IV-A gave flexible coatings on polyethylene bottles which would not crack on extensive repeated bending and squeezing of the bottles, which is a marked improvement over coating formulations comprised of 30 percent of the polyester resin V-B, 30 percent of the styrene/hydroxy copolymer III-A and 40 percent of the aminoplast IV-A. In general, coating compositions of this invention containing amounts of the aminoplast in excess of the numerical range indicated therefor are relatively brittle in comparison to those containing the aminoplast within the indicated range therefor.

Another advantage obtained by the coating compositions of this invention is excellent adhesion to a substrate as compared to the relative adhesion of compositions comprised only of a styrene/hydroxy copolymer and aminoplasts (i.e., devoid of polyester resins described herein).

Still further advantages of this invention reside in quicker cures of the coating compositions and better solvent resistance as compared to mere polyester and aminoplast systems devoid of the styrene/hydroxy copolymers.

For example, formulations containing 80 weight percent of the polyester V-B and 20 weight percent of the aminoplast IV-A require a cure of 15 minutes at 190° F. to obtain a coating which will resist immersion in 5 percent $NH_4OH$ solution for 6 to 10 minutes. In contrast, compositions of this invention containing 50 weight percent of the polyester V-B, 25 weight percent of the styrene/hydroxy copolymer III-A and 25 weight percent of the aminoplast IV-A give the same degree of ammonia resistance after only a 2 minute cure at 190° F. or a 6 minute cure at 170° F.

Also, coating compositions of this invention comprised of 40 percent of the polyester V-E, 30 percent of the styrene/hydroxy copolymer III-A and 30 percent of the aminoplast IV-A when cured for 15 minutes at 190° F. give a coating which is resistant to 5 percent ammonia hydroxide for 70 minutes.

In addition to the specific polymers noted above, other polymers and substrates that can be coated with the coating compositions of this invention include paper, metal and polymer members of the following groups: homopolymers of ethylene, ethylene interpolymers containing at least 50 percent polymerized ethylene, homopolymers of propylene, homopolymers of styrene, styrene interpolymers containing at least 50 percent polymerized styrene, polycarbonates, homopolymers of vinyl chloride, vinyl chloride interpolymers containing at least 50 percent polymerized vinyl chloride, nylon, cellulose acetate, cellulose propionate, cellulose butyrate, melamine-formaldehyde resins, and phenol-formaldehyde resins.

The ethylene homopolymers that may be coated can be of the conventional high pressure type or the so-called linear type. In general, any ethylene homopolymer having a density in the range of about 0.915 to 0.97 may be employed. The ethylene interpolymers that may be employed can be essentially any of the known ethylene interpolymers containing at least 50 weight percent of the polymerized ethylene. Typical examples of such ethylene interpolymers include interpolymers of ethylene with vinyl acetate, methyl acrylate, methyl methacrylate, ethyl acrylate and the like. The propylene homopolymers that may be employed are the isotactic type that are prepared using the so-called Ziegler-type catalysts. The styrene homopolymers that may be employed are those of the type widely used commercially and that are prepared by either mass emulsion or suspension polymerization methods. Styrene interpolymers that are particularly suitable for use in the invention include the so-called "rubber modified" styrene polymers which have high impact strength. Other suitable styrene interpolymers include styrene-acrylonitrile interpolymers and the so-called ABS polymers which are polymers containing styrene, acrylonitrile and a butadiene. The polycarbonates that may be employed are the commercial products which are sold under the trade names of Lexan and Merlon.

The vinyl chloride homopolymers and interpolymers that are useful are of the types commercially available, particularly the homopolymers and the vinyl chloride-vinyl acetate copolymers. The nylons and various cellulosic polymers employed are of the commercially available type employed for molding applications. The melamine and phenolic resins that can be most advantageously coated are of the cured, filled type. In particular, dinnerware molded from filled melamine-formaldehyde resins can be coated to provide dinnerware having high gloss and good abrasion resistance.

The coated polymer articles provided by the present invention have many outstanding properties. Almost without exception, the coatings laid down on the substrate are glossy and aesthetically pleasing. The coatings are tough and flexible, show good adhesion to the substrate, have good abrasion resistance, and have excellent resistance to a wide variety of solvents such as hydrocarbons, alcohols, ketones, alkalies and water. Because of these properties, plastic containers such as bottles which are coated by the method of the invention have outstanding properties. In particular, such coated containers have particular utility in the packaging of cosmetics whose volatile components, as perfuming ingredients, are not readily lost, as is the case when such cosmetics are packaged in conventional plastic containers. Similarly, in the packaging of foods and beverages, flavoring ingredients are not lost by diffusion, as is otherwise encountered when such materials are packaged in conventional plastic containers.

The plastic articles to be coated by the method of the invention can be coated by diverse methods commonly used in the art. For example, such articles can be coated by spraying, brushing, dipping, and the like. If desired, the plastic substrate to be coated can be given a preliminary treatment such as flaming, but this is ordinarily not required. Coatings of optimum properties are obtained by heating the coated article for relatively short times at elevated temperatures, e.g., 5 minutes at temperatures of 175° F.

The above descriptions and particularly the examples are set forth for purposes of illustration only. Many variations and modifications thereof will be apparent to those skilled in the art and can be made without departing from the spirit and scope of the invention herein described.

What is claimed is:
1. A coating composition comprising solvent solution of an admixture comprised of:
  (a) A hydroxy-containing interpolymer of styrene containing from about 35 percent to about 75 percent of chemically combined styrene, based on the weight of said interpolymer, said interpolymer containing at least about 1 weight percent substituent hydroxy groups;
  (b) A polyester reaction product of 2,4,6-trioxo-s-triazine-1,3,5(2H,4H,6H)-trialkanoic acid, and an aliphatic diol, said polyester reaction product having a hydroxy number of at least 50; and
  (c) A curable aminoplast capable of reacting with hydroxy substituent groups, said aminoplast selected from the group consisting of solvent soluble methylol or methylol ether-containing aldehyde reaction products.

2. The coating composition of claim 1 wherein said interpolymer is selected from the group consisting of:
  (a) An oxidized copolymer of styrene and butadiene containing from about 35 percent to about 75 percent of chemically combined styrene based on the weight of the unoxidized copolymer;
  (b) A copolymer of styrene and allyl alcohol; and
  (c) A hydrogenated copolymer of styrene and methacrolein containing from about 35 percent to about 75 percent of chemically combined styrene based on the weight of the unhydrogenated copolymer.

3. The coating composition of claim 2 wherein said aminoplast is selected from the groups consisting of hexamethoxymethyl - melamine, trihydroxymethyl - melamine, dihydroxymethyl ethylene urea, butylated melamine-formaldehyde resin, and butylated urea-formaldehyde resin.

4. A coating composition comprising a solvent solution of an admixture comprised of:
  (a) 10 to 40 parts by weight of a hydroxy-containing interpolymer of styrene containing from about 1 to about 10 weight percent substituent hydroxy groups;
  (b) 40 to 75 parts by weight of a polyester reaction product of 2,4,6-trioxo-s-triazine - 1,3,5(2H,4H,6H)-trialkanoic acid and a polyhydric alcohol, said polyester reaction product having a hydroxyl number of at least 50; and
  (c) 15 to 35 parts by weight of a curable aminoplast capable of reacting with hydroxy substituent groups and being selected from the group consisting of solvent soluble methylol or methylol ether-containing aldehyde reaction products.

5. The coating composition of claim 4 wherein said interpolymer is selected from the group consisting of:
  (a) An oxidized copolymer of styrene and butadiene containing from about 35 percent to 75 percent of chemically combined styrene based on the weight of the unoxidized copolymer, with said oxidized copolymer, based thereon, containing from about 1 to about 10 weight percent of hydroxy substituent groups;
  (b) A copolymer of styrene and allyl alcohol containing from about 50 percent to about 85 percent of chemically combined styrene based on the weight of said copolymer; and
  (c) A hydrogenated copolymer of styrene and methacrolein containing from about 60 percent to about 85 percent of chemically combined styrene based on the weight of the unhydrogenated copolymer, with said hydrogenated copolymer containing, based thereon, from about 4 percent to about 10 weight percent of hydroxy substituent groups;
with said aminoplast selected from the group consisting of hexamethoxymethyl - melamine, trihydroxymethyl - melamine, dihydroxymethyl ethylene urea, butylated melamine-formaldehyde resin, and butylated urea-formaldehyde resin.

6. The composition of claim 5 wherein said polyester resin has a hydroxy number of at least 50 and is the reaction product of 2,4,6-trioxo-s-triazine - 1,3,5(2H,4H,6H)-trialkanoic acid, a polyhydric alcohol and a dicarboxylic acid with said 2,4,6-trioxo-s-triazine-1,3,5(2H,4H,6H)-trialkanoic acid constituting at least 30 mole percent of the polybasic acid moiety of the polyester.

7. A solvent free and cured composition of claim 6.

8. A solid olefin polymer article with the surface thereof coated with the composition of claim 6.

9. The article of claim 8 wherein said composition is solvent free and cured.

10. The article of claim 9 wherein said polymer is polyethylene.

11. The article of claim 10 wherein said article is a bottle.

12. The composition of claim 6 wherein said polyhydric alcohol is neopentyl glycol, said dicarboxylic acid is adipic acid, and said interpolymer is said oxidized copolymer of styrene and butadiene.

13. The composition of claim 6 wherein said aminoplast is hexamethoxymethyl-melamine.

14. A solvent free and cured composition of claim 13.

15. A solid olefin polymer article having the surface thereof coated with the composition of claim 13.

16. The article of claim 15 wherein said composition is solvent free and cured.

17. The article of claim 16 wherein said article is of polyethylene.

18. The article of claim 7 comprising a bottle.

19. The article of claim 16 comprising a bottle.

20. The composition of claim 6 wherein said polyhydric alcohol is neopentyl glycol, said dicarboxylic acid is adipic acid, and said interpolymer is said hydrogenated copolymer of styrene and methacrolein.

21. The composition of claim 6 wherein said polyhydric alcohol is neopentyl glycol, said dicarboxylic acid is adipic acid, and said interpolymer is said copolymer of styrene and allyl alcohol.

22. An article comprising a substrate coated with a solvent free and cured composition of claim 5.

23. An article comprising a substrate coated with a solvent free and cured composition of claim 6.

24. The coating composition of claim 1 wherein said interpolymer of styrene is prepared by a method selected from the group consisting of polymerizing styrene with a polymerizable unsaturated alcohol, or modification of styrene copolymers, such as oxidation of styrene-butadiene copolymer and hydrogenation of styrene-methacrolein copolymer.

25. The coating composition of claim 4 wherein said interpolymer of styrene is prepared by a method selected from the group consisting of polymerizing styrene with a polymerizable unsaturated alcohol, or modification of styrene copolymers, such as oxidation of styrene-butadiene copolymer and hydrogenation of styrene-methacrolein copolymer.

References Cited
UNITED STATES PATENTS

| | | | |
|---|---|---|---|
| 2,940,945 | 6/1960 | Christenson et al. | 260—850 |
| 3,230,275 | 1/1966 | Sekmakas | 260—850 |
| 3,279,940 | 10/1966 | Francis et al. | 117—94 |

MURRAY TILLMAN, *Primary Examiner.*

JOHN C. BLEUTGE, *Assistant Examiner.*